United States Patent
Babazadeh et al.

(10) Patent No.: US 10,425,006 B2
(45) Date of Patent: Sep. 24, 2019

(54) DYNAMIC VOLTAGE TRANSITION CONTROL METHODS FOR SWITCHED MODE POWER CONVERTERS

(71) Applicant: Infineon Technologies Austria AG, Villach (AT)

(72) Inventors: Amir Babazadeh, Laguna Hills, CA (US); Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 116 days.

(21) Appl. No.: 15/438,812

(22) Filed: Feb. 22, 2017

(65) Prior Publication Data

US 2017/0163156 A1   Jun. 8, 2017

Related U.S. Application Data

(63) Continuation of application No. 14/483,615, filed on Sep. 11, 2014, now Pat. No. 9,614,444.

(51) Int. Cl.
| | |
|---|---|
| *G01R 19/04* | (2006.01) |
| *H02M 3/158* | (2006.01) |
| *H02M 3/157* | (2006.01) |
| *H02M 1/08* | (2006.01) |
| *H02M 1/00* | (2006.01) |

(52) U.S. Cl.
CPC ............ *H02M 3/158* (2013.01); *H02M 1/08* (2013.01); *H02M 3/157* (2013.01); *H02M 3/1584* (2013.01); *H02M 3/1588* (2013.01); *H02M 2001/0009* (2013.01); *H02M 2001/0025* (2013.01); *Y02B 70/1466* (2013.01)

(58) Field of Classification Search
CPC ...... H02M 3/156; H02M 3/157; H02M 3/158; H02M 3/1584; H02M 3/1588; G05F 3/02
See application file for complete search history.

(56) References Cited

U.S. PATENT DOCUMENTS

| | | | |
|---|---|---|---|
| 7,834,608 B2 | 11/2010 | Cheng et al. | |
| 8,305,059 B2* | 11/2012 | Al-Shyoukh | ......... H03F 3/2173 323/222 |
| 2008/0303501 A1 | 12/2008 | Prodic | |
| 2009/0121695 A1 | 5/2009 | Pierson et al. | |
| 2011/0316518 A1 | 12/2011 | Feng et al. | |
| 2014/0043008 A1 | 2/2014 | Babazadeh et al. | |
| 2014/0084886 A1 | 3/2014 | Causse et al. | |
| 2014/0266122 A1 | 9/2014 | Zhu et al. | |

FOREIGN PATENT DOCUMENTS

| | | |
|---|---|---|
| CN | 103532373 A | 1/2014 |
| CN | 103812342 A | 5/2014 |

* cited by examiner

*Primary Examiner* — Minh N Tang
(74) *Attorney, Agent, or Firm* — Murphy, Bilak & Homiller, PLLC

(57) ABSTRACT

A method of controlling a voltage regulator includes regulating a voltage output by the voltage regulator to correspond to a target voltage, generating a voltage ramp that starts at a first voltage and ends at a second voltage and responsive to the voltage ramp, modifying the output voltage response of the voltage regulator based on one or more compensation parameters.

20 Claims, 10 Drawing Sheets

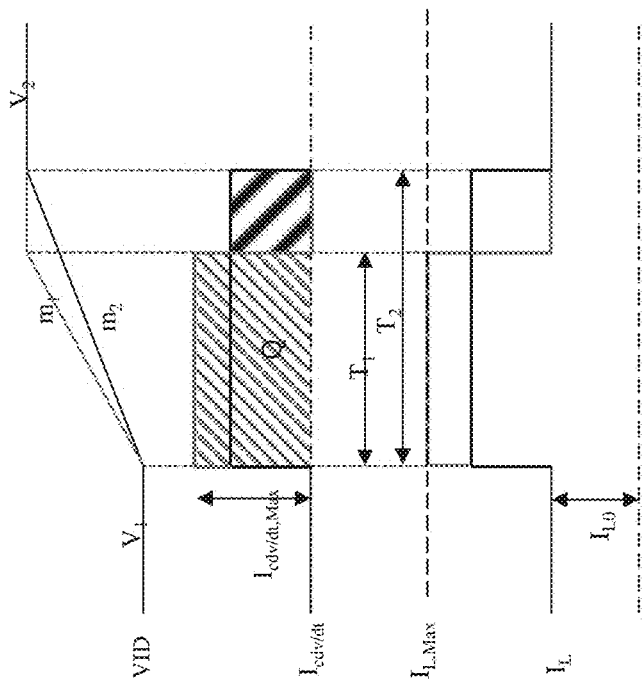
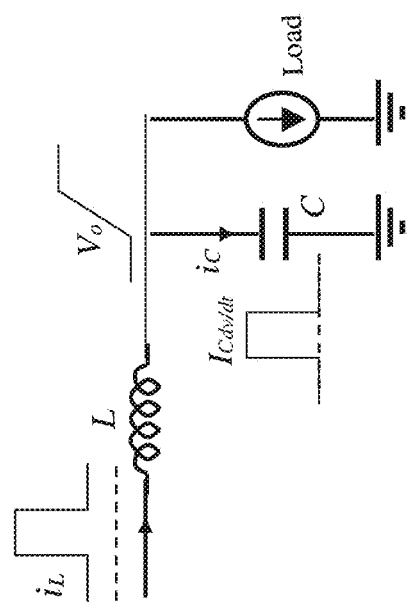
Figure 9A
Figure 9B

DYNAMIC VOLTAGE TRANSITION CONTROL METHODS FOR SWITCHED MODE POWER CONVERTERS

TECHNICAL FIELD

The present application relates to switched mode power-converter, in particular control of dynamic voltage transitions in switched mode power converters.

BACKGROUND

Switching voltage regulators are widely used in modern electronic systems for a variety of applications such as computing (server and mobile) and POLs (Point-of-Load Systems) for telecommunications because of their high efficiency and small amount of area/volume consumed by such converters. Widely accepted switching voltage regulator topologies include buck, boost, buck-boost, forward, flyback, half-bridge, full-bridge, and SEPIC topologies. Multiphase buck converters are particularly well suited for providing high current at low voltages needed by high-performance integrated circuits such as microprocessors, graphics processors, and network processors. Buck converters are implemented with active components such as a pulse width modulation (PWM) controller IC (integrated circuit), driver circuitry, one or more phases including power MOS-FETs (metal-oxide-semiconductor field-effect transistors), and passive components such as inductors, transformers or coupled inductors, capacitors, and resistors. Multiple phases (power stages) can be connected in parallel to the load through respective inductors to meet high output current requirements.

Many electronic systems, such as microprocessors, require power supplies to operate more efficiently in order to avoid thermal overload at high loads and to increase battery life particularly in portable systems. Advanced real-time embedded systems, including both battery-operated portable systems (such as laptops, cellular phones etc.) and non-portable systems (such as servers, desktops, etc.), often include one or more microprocessors where at the system level it is possible to reduce energy consumption by changing the frequency and voltage level of the microprocessor i.e. so-called dynamic voltage scaling. Dynamic voltage scaling reduces the energy consumption by changing processor speed and voltage at run-time depending on the needs of the applications running on the microprocessor. It has been shown that the processor power consumption increases in convex fashion with frequency, therefore dynamic voltage scaling helps to significantly reduce the dynamic energy consumption of the processor. This technique is also commonly referred to as dynamic voltage transitioning. Due to the importance of dynamic voltage transition in switched mode power converters, there is growing demand for new control techniques that improve the voltage transitioning response which in turn results in even more power saving and overall efficiency in the switched mode power converters.

SUMMARY

According to an embodiment of a voltage regulator controller, the voltage regulator controller comprises a main compensator and a voltage ramp circuit. The main compensator is operable to control a voltage regulator so that a voltage output by the voltage regulator corresponds to a target voltage indicated to the voltage regulator controller. The voltage ramp circuit comprises a voltage ramp generator operable to output a voltage ramp that starts at a first voltage and ends at a second voltage, and a dynamic voltage transition compensation circuit responsive to the voltage ramp generator and operable to modify the output voltage response of the voltage regulator based on one or more compensation parameters.

According to an embodiment of a switched mode power converter, the switched mode power converter comprises a power stage operable to output a voltage to a load, a main compensator operable to control switching of the power stage so that the voltage output by the power stage corresponds to a target voltage indicated to the switched mode power converter, and a voltage ramp circuit that comprises a voltage ramp generator and a dynamic voltage transition compensation circuit. The voltage ramp generator is operable to generate a voltage ramp that starts at a first voltage corresponding to the target voltage and ends at a second voltage corresponding to a new target voltage. The dynamic voltage transition compensation circuit is responsive to the voltage ramp generator and operable to modify the output voltage response of the switched mode power converter based on one or more compensation parameters.

According to another embodiment of a switched mode power converter, the switched mode power converter comprises a power stage operable to output a voltage to a load, a main compensator operable to control switching of the power stage so that the voltage output by the power stage corresponds to a target voltage indicated to the switched mode power converter, and a ramp generator operable to control a slew rate of a dynamic voltage transition from the target voltage to a new target voltage. The switched mode power converter further comprises an auxiliary compensator operable to override the main compensator and alter a dynamic voltage transition response of the main compensator.

According to an embodiment of a method of controlling a voltage regulator, the method comprises: regulating a voltage output by the voltage regulator to correspond to a target voltage; generating a voltage ramp that starts at a first voltage and ends at a second voltage; and responsive to the voltage ramp, modifying the output voltage response of the voltage regulator based on one or more compensation parameters.

According to an embodiment of a method of controlling a switched mode power converter that includes a power stage operable to output a voltage to a load, the method comprises: regulating the voltage output by the power stage to correspond to a target voltage indicated to the switched mode power converter; generating a voltage ramp that starts at a first voltage corresponding to the target voltage and ends at a second voltage corresponding to a new target voltage; and responsive to the voltage ramp, modifying the output voltage response of the switched mode power converter based on one or more compensation parameters.

According to an embodiment of a method of controlling a switched mode power converter that includes a power stage operable to output a voltage to a load and a main compensator operable to control switching of the power stage so that the voltage output by the power stage corresponds to a target voltage indicated to the switched mode power converter, the method comprises: controlling a slew rate of a dynamic voltage transition from the target voltage to a new target voltage; and overriding the main compensator and altering a dynamic voltage transition response of the main compensator via an auxiliary compensator.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIGS. 9A and 9B illustrate the ideal inductor and capacitor currents required for ramp-type dynamic voltage transition (FIG. 9A) and the net charge for completing any type of dynamic voltage transition (FIG. 9B).

DETAILED DESCRIPTION

Figure 1:
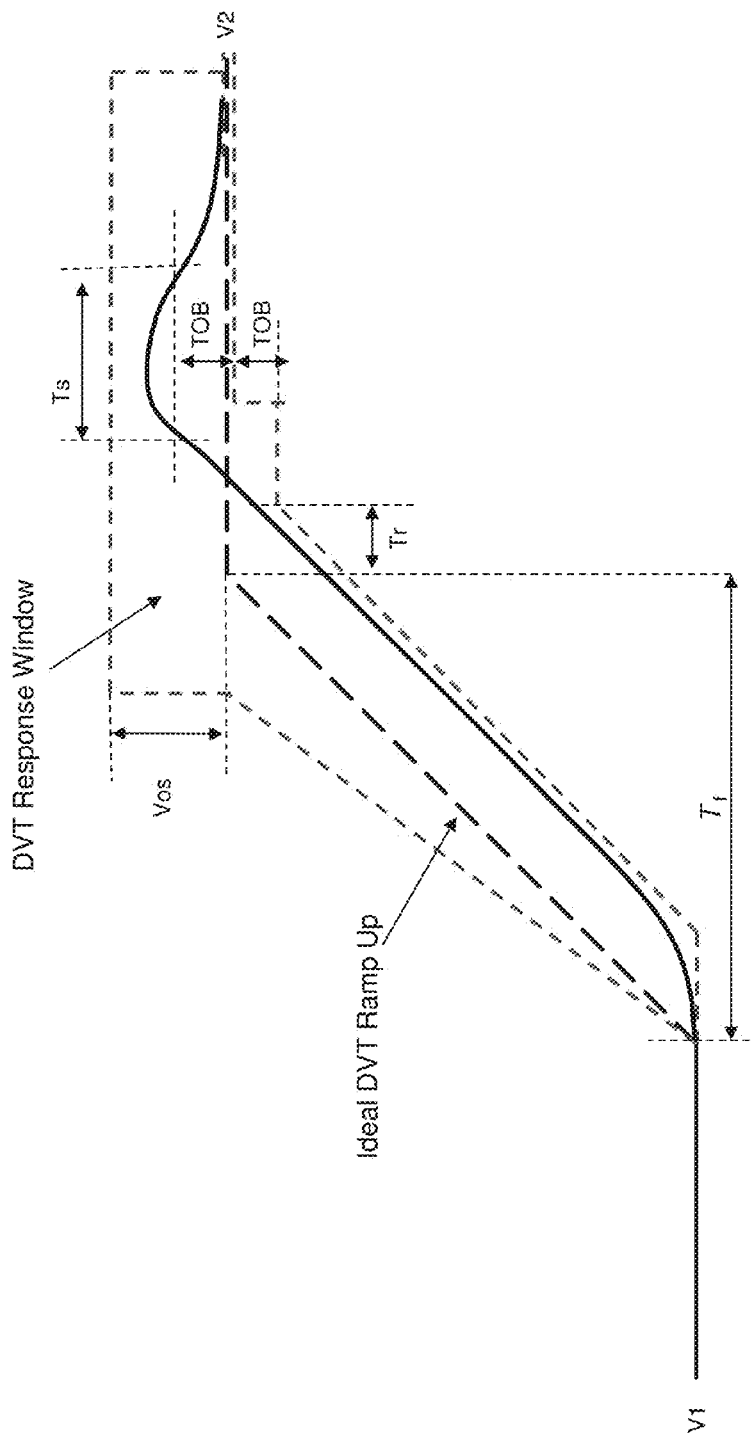
FIG. 1 illustrates a plot diagram of a dynamic voltage transition waveform from a first voltage (V1) to a second voltage (V2).

FIG. 1 illustrates an exemplary dynamic voltage transition from a first voltage (V1) to a second voltage (V2), as implemented by a switched mode power converter. A dynamic voltage transition typically involves adjusting the load voltage at run-time in response to changes in load demand. Many electronic systems such as microprocessors require the dynamic voltage transition (DVT) to be completed inside a designated window ('DVT Response Window'). The dimensions of the DVT window are defined by DVT parameters such as voltage overshoot (Vos), tolerable band (TOB), transition time (Tf+Tr) and settling time (Ts). In many applications, it is desirable to reduce the dimensions of the DVT window. The embodiments described herein optimize i.e. make perfect, effective, or functional as possible dynamic voltage transitions implemented by a switched mode power converter to provide a high performance response. For example, the time to reach the new target voltage V2 can be minimized by reducing ramp lag and latency, and multiple pre-emptive transitions can be responded to where a new target voltage is given before the previous target is reached, by optimizing the response to reach the new target. Overshoot and/or undershoot control also can be provided. For example, overshoot can be allowed albeit with some voltage and time constraint. Undershoot may not be allowed, but a settling tail may be acceptable. Ringing in the waveform response can be minimized. Voltage and current constraints also can be maintained e.g. by providing over-voltage and/or under-voltage protection, adhering to positive and negative current limits, reducing system noise from input and output dV/dt and dI/dt, etc.

Figure 2:
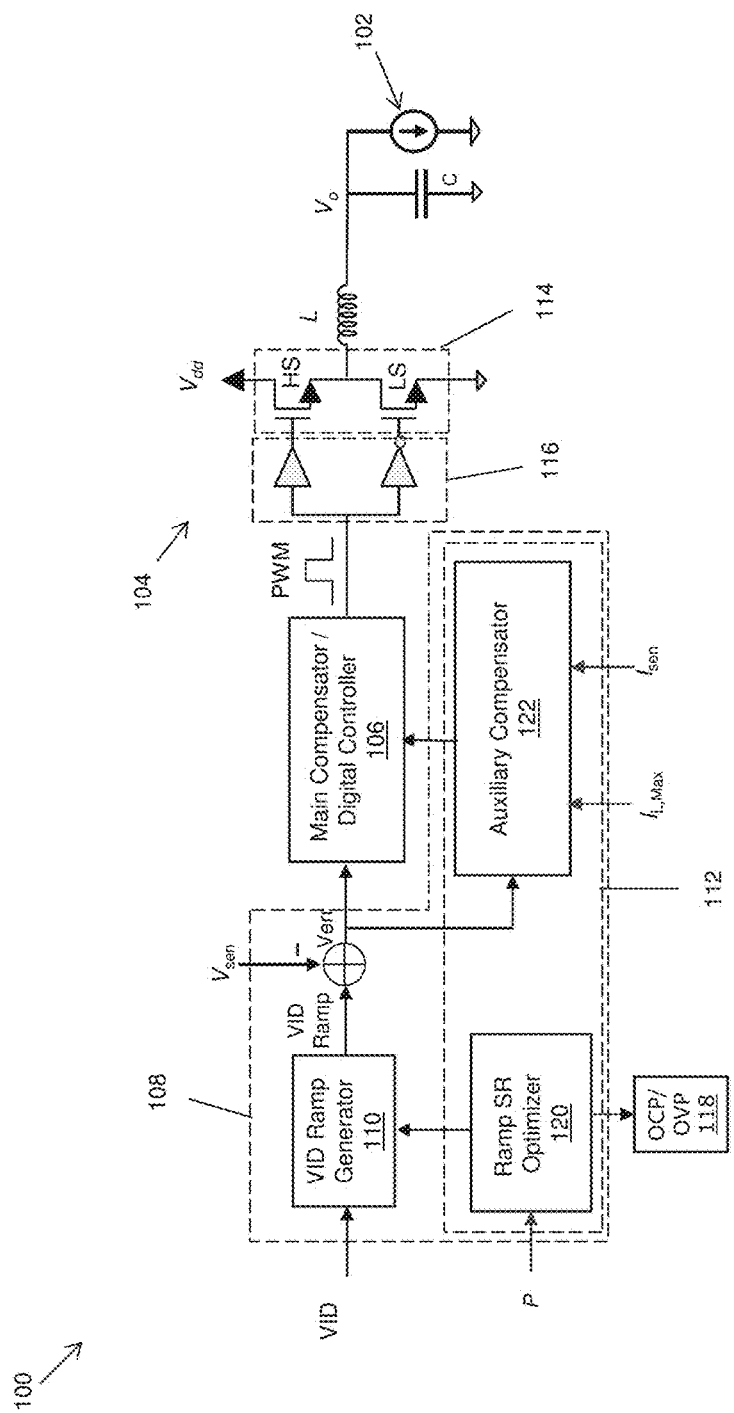
FIG. 2 illustrates a block diagram of an embodiment of a switched mode power converter that includes a dynamic voltage transition compensation circuit.

FIG. 2 illustrates an embodiment of a switched mode power converter 100 for regulating a load 102. The load 102 is schematically illustrated in FIG. 2, and can be a high-performance integrated circuit such as a microprocessor, graphics processor, network processor, etc. or other type of integrated circuit requiring voltage regulation such as a POL (point-of-load). The switched mode power converter 100 comprises a power stage 104 for outputting a voltage (Vo) to the load 102, a main compensator 106 for controlling switching of the power stage 104 so that the voltage output by the power stage 104 corresponds to a target voltage (VID) indicated to the switched mode power converter 100, and a voltage ramp circuit 108 for modifying or overriding the dynamic voltage transitioning behavior of the main compensator 106. The voltage ramp circuit 108 comprises a voltage ramp generator 110 and a dynamic voltage transition compensation circuit 112.

The voltage ramp generator 110 is operable to generate a voltage ramp (VID ramp) that starts at a first voltage (e.g. V1 in FIG. 1) corresponding to the target voltage and ends at a second voltage (e.g. V2 in FIG. 1) corresponding to a new target voltage. The voltage ramp generator 110 receives voltage identification information (VID) e.g. from the load 102 in the case of a microprocessor, which indicates the target voltage to which the switched mode power converter 100 should regulate. The target voltage can change from time-to-time e.g. based on load conditions. The voltage ramp generated by the voltage ramp generator 110 has a dynamic voltage transition during a change from one target voltage to a different target voltage.

The dynamic voltage transition compensation circuit 112 is responsive to the voltage ramp generator 110 and modifies the voltage ramp based on one or more compensation parameters (P). The compensation parameter(s) can be any system parameter associated with operation of the switched mode power converter 100 and that affects the voltage ramp generated by the voltage ramp generator 110. For example, compensation parameters such as maximum inductor current ($I_{L,Max}$), sensed current (Isen), output capacitance (C), the number of power stage phases, etc. can affect the voltage ramp. The dynamic voltage transition compensation circuit 112 can modify the output voltage response of the switched mode power converter based on such compensation parameters to modify the dimensions of the DVT window shown in FIG. 1, so that the dynamic voltage transitions are optimized to provide a high performance response. In general, the dynamic voltage transition compensation circuit 112 modifies the system error through the voltage and/or current feedback paths of the system.

The power stage 104 of the switched mode power converter 100 is shown with one phase 114 in FIG. 2 for ease of illustration. Each phase 114 of the power stage 104 includes a high-side transistor (HS) and a low-side transistor (LS) for coupling to the load 102 through a respective inductor (L) and an output capacitor (C). The power stage 114 also includes a driver 116 for independently driving the high side and low side transistors of each phase 114. The high-side transistor switchably connects the load 102 to an input voltage (Vdd) of the switched mode power converter 100, and the low-side transistor switchably connects the load 102 to ground at different periods. In general, the power stage 104 of the switched mode power converter 100 can include any number of phases 114 including a single phase or more than one phase.

The main compensator 106 of the switched mode power converter 100 is implemented as part of a digital controller that controls the overall switching behavior of the power stage 104. The digital controller 106 can regulate the voltage (Vo) delivered to the load 102 by the power stage 104, by adjusting the phase currents delivered to the load 102 based on a voltage error signal (Verr). The controller 106 can also include a digital PWM (pulse width modulation) control loop for switching the phases 114 of the power stage 104 via the corresponding driver 116, so that the phases 114 source or sink current to the load 102 through the corresponding inductor and the high-side or low-side transistor. The power stage 104 can comprise a plurality of phases 114 at least one of which is switched by a respective PWM signal (PWM) during a dynamic voltage transition in the voltage ramp and one or more of which are initially deactivated prior to the dynamic voltage transition. The dynamic voltage transition compensation circuit 112 can re-activate one or more of the deactivated phases 114 e.g. at a leading edge of the corresponding PWM signal during the dynamic voltage transition. In general, the dynamic voltage transition compensation circuit 112 can be implemented as part of the same digital controller as the main compensator 106, or as part of a separate controller.

In either case, the main compensator 106 attempts to minimize the voltage error and the dynamic voltage transition compensation circuit 112 can optimize the slew rate and/or reshape the error to move the output voltage in the desired direction based on one or more of the compensation parameters (P). For example, the dynamic voltage transition compensation circuit 112 can optimize the voltage ramp slew rate, subject to multiple constraints such as a target slew rate, buck inductance (L), output capacitance (C), input current limit, input dI/dt limit, output current limit ($I_{L,Max}$), output dI/dt limit, etc. The compensation circuit 112 can also base slew rate optimization on system feedback information such as input voltage (Vdd), sensed output voltage (Vsen), sensed output current (Isen), temperature, etc. The dynamic voltage transition compensation circuit 112 can optimize the voltage ramp slew rate while accounting for temperature/thermal limits. As used herein, the term 'slew rate' refers to the maximum rate of change of output voltage per unit of time and is typically expressed as volts per second. The dynamic voltage transition compensation circuit 112 can also adjust overcurrent protection (OCP) and/or overvoltage protection (OVP) mechanisms 118 implemented by the switched mode power converter 100 based on the slew rate adjustment made by the dynamic voltage transition compensation circuit 112. For example, the dynamic voltage transition compensation circuit 112 can change or override at least one of an OCP limit and an OVP limit for the switched mode power converter 100 during a dynamic voltage transition in the voltage ramp (VID Ramp). The dynamic voltage transition compensation circuit 112 can directly modify the output voltage response of the switched mode power converter through control of the voltage ramp generator 110, or indirectly modify the output voltage response of the switched mode power converter by modifying or bypassing the operation of the main compensator 106.

The voltage ramp generator 110 can determine a slew rate (SR) for a dynamic voltage transition in the voltage ramp. The dynamic voltage transition compensation circuit 112 comprises a ramp slew rate optimizer 120 for modifying the slew rate of the voltage ramp based on one or more system parameters. For example, there are two main sources of error during a dynamic voltage transition. First, the capacitor current during dynamic voltage transition $I_{Cdv/dt}$ drives the output voltage (Vo) away from the target voltage thorough an AVP (adaptive voltage positioning) loop. By compensating for the capacitor current ($I_{Cdv/dt}$), the ramp slew rate optimizer 120 can move the output voltage towards the target voltage and decrease lag. Compensating for the capacitor current also compensates for an over damped response. The second main source of error during a dynamic voltage transition is the ESR (equivalent series resistance) voltage drop of the output capacitor, which drives the capacitor voltage away from the target voltage. By compensating for ESR, the ramp slew rate optimizer 120 can move the output voltage towards the target voltage and decrease the settling tail. Compensating for ESR also compensates for an under-damped response. As such, the dynamic voltage transition compensation circuit 112 can modify the voltage error into the main compensator for compensating for ($I_{Cdv/dt}$) and capacitor ESR voltage drop.

The dynamic voltage transition compensation circuit 112 can modify or override the operation of the main compensator 106. In one embodiment, the power stage 104 is coupled to the load 102 via an inductor (L) and the ramp slew rate optimizer 120 limits the slew rate so that current in the inductor does not saturate (exceed $I_{L,Max}$) during a dynamic voltage transition in the voltage ramp. For example, the ramp slew rate optimizer 120 can limit the slew rate by eliminating one or more PWM (pulse width modulation) pulses generated by the main compensator 106 for controlling the switching of the power stage 104.

The main compensator 106 controls the switching of the power stage 104 based on an error voltage (Verr) that corresponds to the difference between the voltage ramp and a feedback voltage (Vsen). The dynamic voltage transition compensation circuit 112 can modify the error voltage e.g. instead of the target voltage, in effect (indirectly) modifying the output voltage response of the power stage 104. In one embodiment, the dynamic voltage transition compensation circuit 112 includes an auxiliary compensator 122 that modifies the error voltage Verr by scaling one or more compensation parameters responsive to the voltage ramp. For example, the auxiliary compensator 122 can scale one or more compensation parameters to overcompensate/undercompensate the voltage ramp so that overshoot/undershoot in the voltage ramp is intentionally increased or decreased. The auxiliary compensator 122 can scale the one or more compensation parameters differently for positive voltage ramps than for negative voltage ramps, so that the dynamic voltage transition response of the switched mode power converter 100 can be tailored to each (positive and negative) direction of a dynamic voltage transition. The auxiliary compensator 122 can be implemented as part of the same digital controller as the main compensator 106, or as part of a separate controller.

Figure 3:
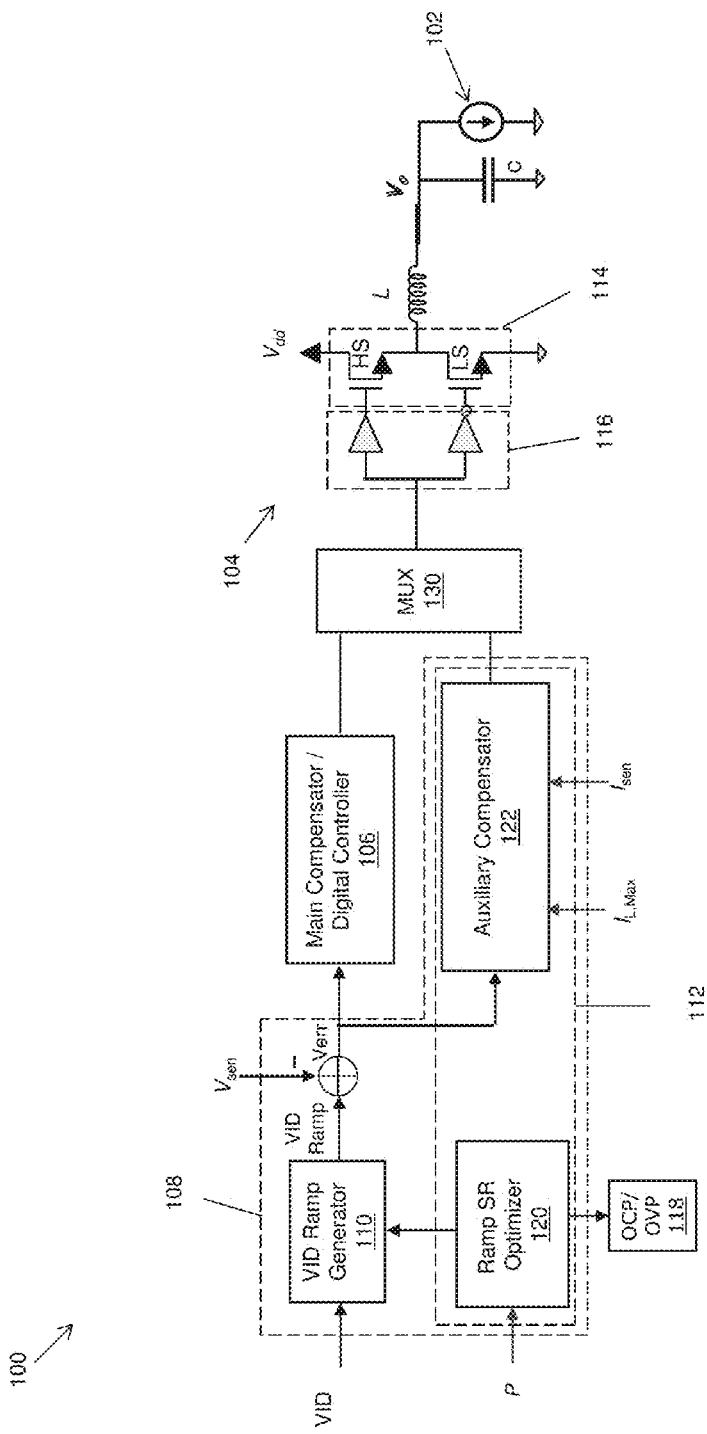
FIG. 3 illustrates a block diagram of another embodiment of a switched mode power converter that includes a dynamic voltage transition compensation circuit.

FIG. 3 illustrates another embodiment of the switched mode power converter 100. According to this embodiment, the dynamic voltage transition compensation circuit 112 overrides operation of the main compensator 106 during dynamic voltage transition events in the voltage ramp (VID Ramp). The auxiliary compensator 122 is selected e.g. via a multiplexor 130 for controlling the switching of the power stage 104 during a dynamic voltage transition in the voltage ramp (VID ramp) output by the voltage ramp generator 110, and the main compensator 106 is otherwise selected by the multiplexor 130 for controlling the switching of the power stage 104.

Figure 4:
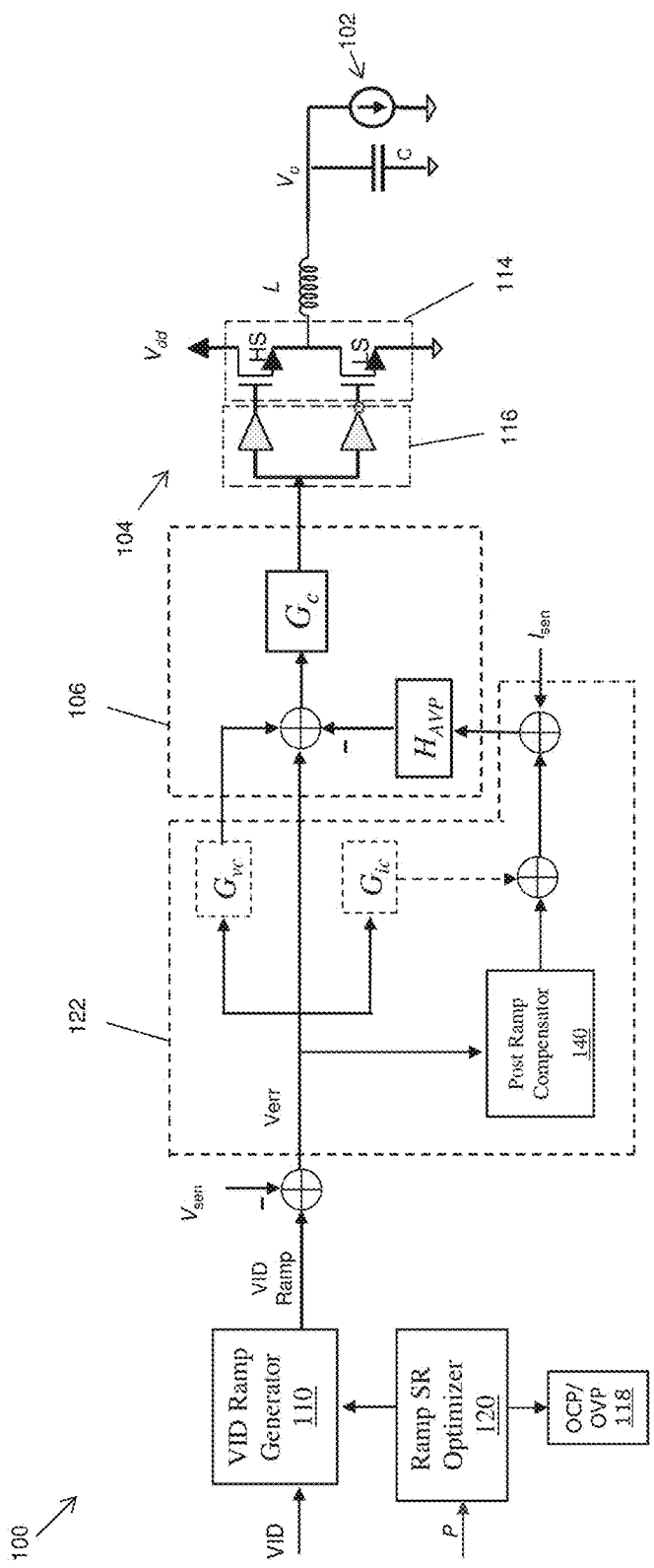
FIG. 4 illustrates a block diagram of yet another embodiment of a switched mode power converter that includes a dynamic voltage transition compensation circuit.

FIG. 4 illustrates an embodiment of the auxiliary compensator 122 of the dynamic voltage transition compensation circuit 112. According to this embodiment, the voltage ramp signal (VID Ramp) output by the voltage ramp generator 110 is compared to a sensed voltage (Vsen) which corresponds to the output voltage (Vo) of the switched mode power converter 100. The auxiliary compensator 122 alters the dynamic voltage transition response of the main compensator 106 based on the difference (Verr) between the voltage ramp signal and the sensed voltage feedback, where Verr is a voltage error signal. In more detail, the auxiliary compensator 122 shapes Verr to achieve a desired output. To this end, the auxiliary compensator 122 includes a voltage compensation block ($G_{vc}$) which is used for reshaping the Verr in order to control the output voltage. The auxiliary compensator 122 also includes a current compensation block ($G_{ic}$) which functions similar to the voltage compensation block but instead operates on the current-related portion of the error. The auxiliary compensator 122 further includes a post-ramp compensator 140 for reshaping Verr after ending the ramp, so as to control the post-ramp transient. In effect, the post-ramp compensator 140 adjusts the voltage compensation and the current compensation provided by the main compensator 106. The ramp slew rate optimizer 120 of the dynamic voltage transition compensation circuit 112 optimizes the ramp slew rate based on system information and conditions as previously described herein.

The main compensator 106 includes a compensation block ($G_c$) for shaping the output voltage error such that the output voltage is controlled and behaves as desired. Such compensation blocks are well known and common in digital regulator controllers, and therefore no further explanation is given in this regard. The main compensator 106 also includes an AVP (adaptive voltage positioning) block ($H_{AVP}$) for adjusting the output voltage (Vo) according to the sensed output current (Isen). The AVP block $H_{AVP}$ uses the sensed output current Isen, compensated for droop resistance ($R_D$) of the load 102, to generate an AVP offset. The outputs of the post-ramp compensator 140 and of the current compensation block $G_{ic}$ are combined, the combination of which in turn is combined with Isen to form the input to the AVP block $H_{AVP}$. The output of the AVP block $H_{AVP}$ is combined with Verr and the output of the voltage compensation block $G_{vc}$ to form the input to the compensation block $G_c$ of the main compensator 106. Operation of the power stage 104 is controlled by the output of the compensation block $G_c$ of the main compensator 106. The various blocks of the main and auxiliary compensators 106, 122 can be implemented as filters in the same or different digital controllers.

Figure 5:
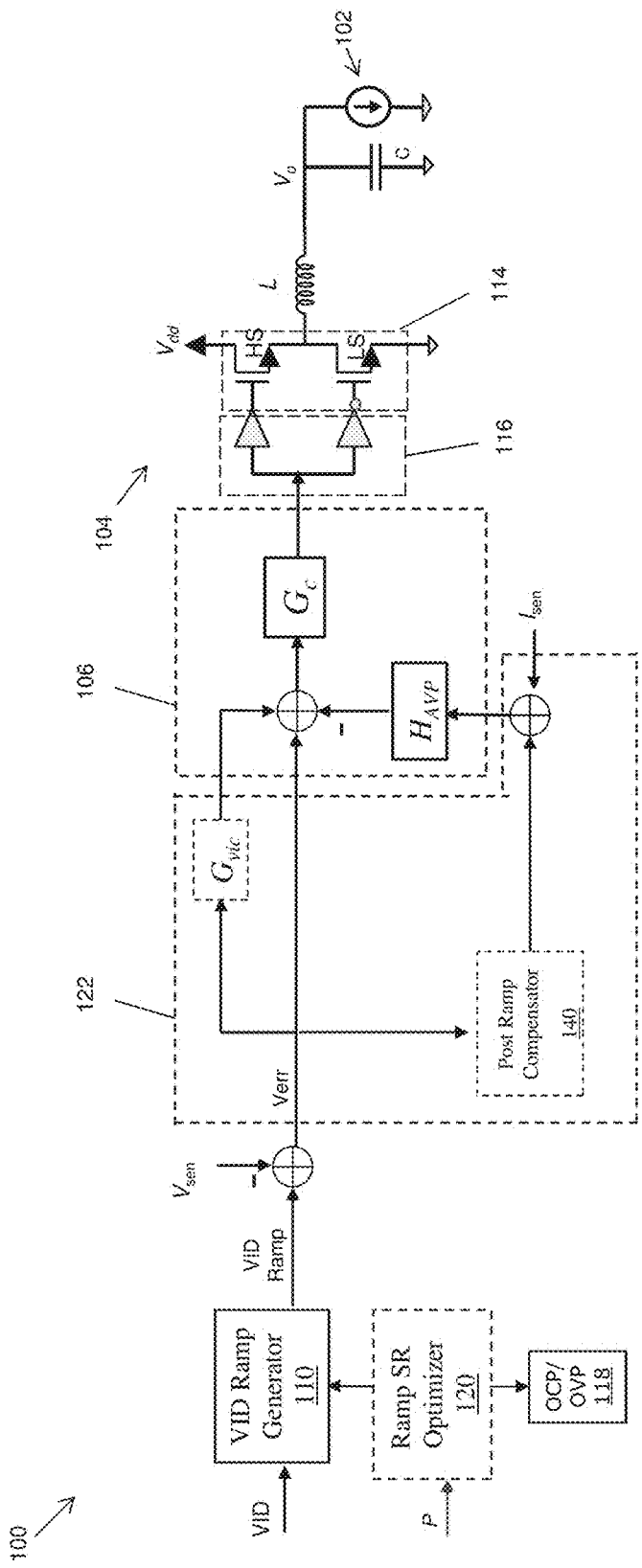
FIG. 5 illustrates a block diagram of still another embodiment of a switched mode power converter that includes a dynamic voltage transition compensation circuit.

FIG. 5 illustrates another embodiment of the auxiliary compensator 122 of the dynamic voltage transition compensation circuit 112. The embodiment shown in FIG. 5 is similar to the embodiment shown in FIG. 4. Different however, the voltage compensation block $G_{vc}$ and the current compensation block $G_{vc}$ of the auxiliary compensator 122 are combined into a single voltage-current compensator block $G_{vic}$. The operational behavior of the auxiliary compensator 122 is the same as explained in connection with FIG. 4.

Figure 6:
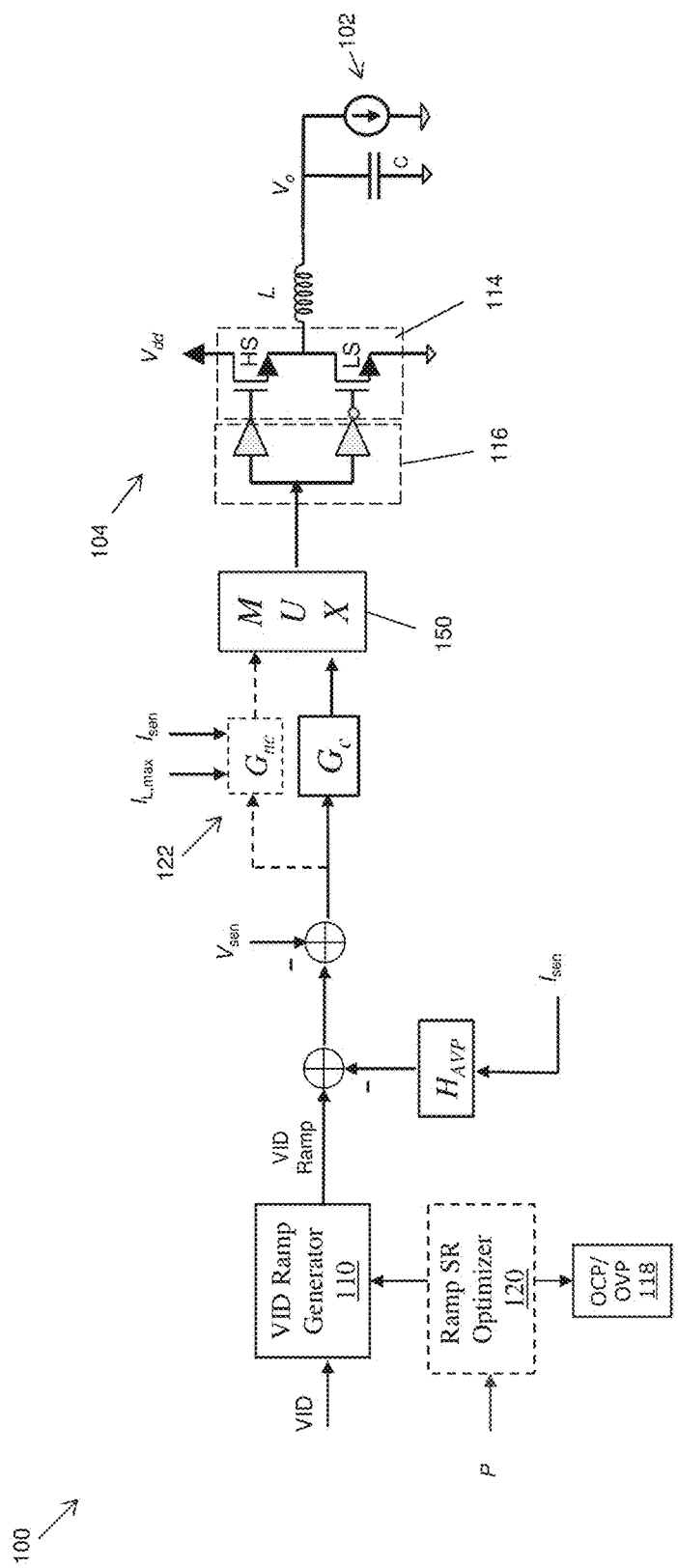
FIG. 6 illustrates a block diagram of an embodiment of a switched mode power converter that includes a dynamic voltage transition compensation circuit.

FIG. 6 illustrates yet another embodiment of the auxiliary compensator 122 of the dynamic voltage transition compensation circuit 112. Different than the embodiments illustrated in FIGS. 4 and 5 in which the auxiliary compensator 122 reshapes the voltage error Verr to control the output voltage (Vo) and the main compensator 106 is always active, the embodiment illustrated in FIG. 6 implements the dynamic voltage transition compensation circuit 112 as a nonlinear control block ($G_{nc}$) which takes over system control from the main compensator 106 during a dynamic voltage transition event and returns control to the main compensator 106 after the dynamic voltage transition event sufficiently settles. For example, a multiplexor 150 can be provided for switching between the nonlinear control block $G_{nc}$ of the dynamic voltage transition compensation circuit 112 and the compensation block $G_c$ of the main compensator 106 responsive to dynamic voltage transition events. The nonlinear control block $G_c$ of the dynamic voltage transition compensation circuit 112 can be implemented as a filter in a digital controller.

Figure 7:
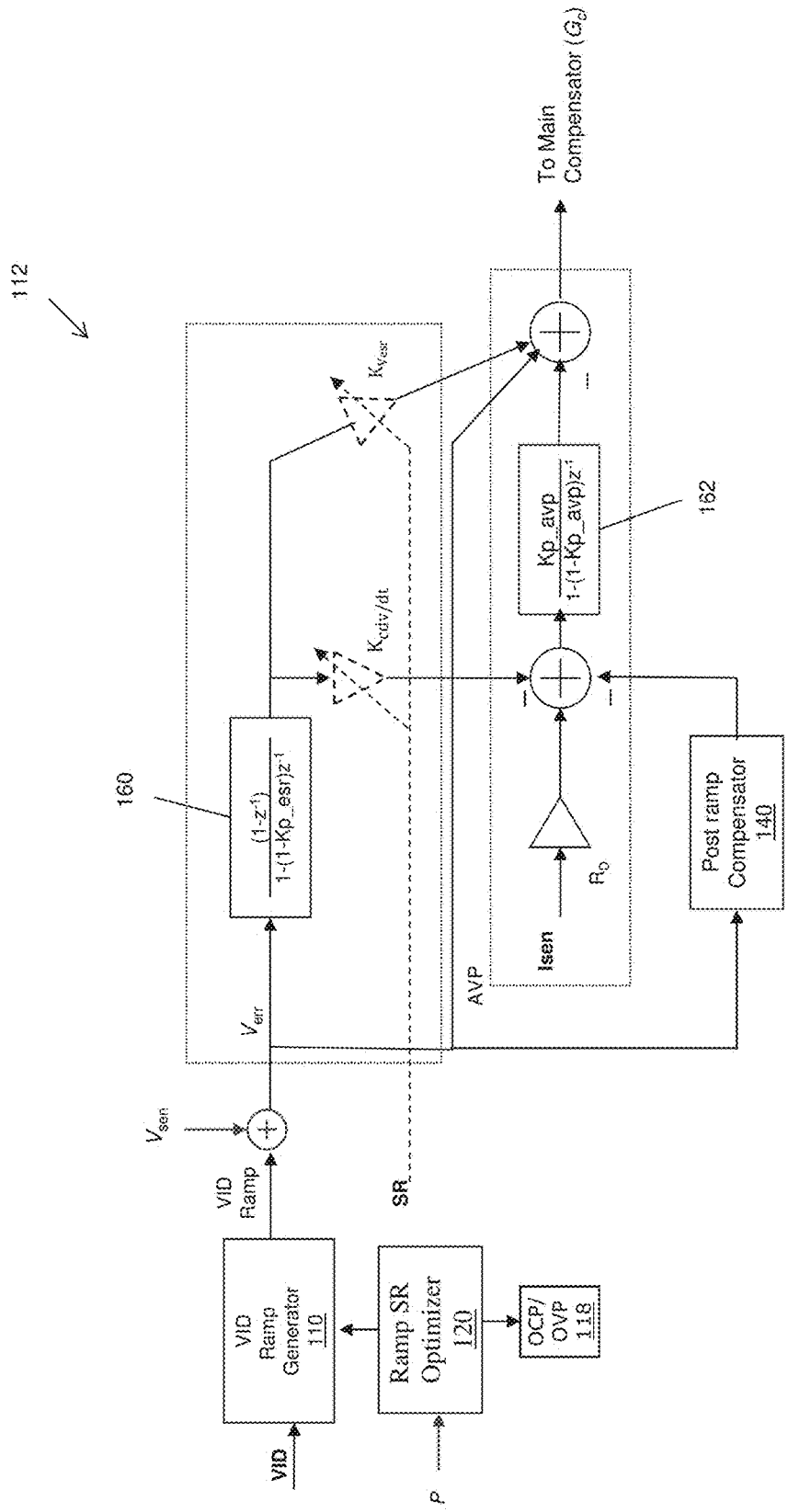
FIG. 7 illustrates a block diagram of an embodiment of a dynamic voltage transition compensation circuit.

FIG. 7 illustrates an embodiment of the auxiliary compensator 122 shown in FIGS. 4 and 5. According to this embodiment, the compensation block $G_c$ of the main compensator 106 includes a compensation filter 160 that adjusts the AVP response of the switched mode power converter 100, by removing the portion of the load current ($I_L$) during dynamic voltage transition events. The $I_{cdv/dt}$ portion of the load current corresponds to the impulse current from the output capacitor (C). The compensation filter 150 can include a capacitor current gain component ($K_{cdv/dt}$) which can be set to remove the $I_{cdv/dt}$ portion of the load current. Even with the impulse current removed, lag is still present in the output voltage Vo due to ESR of the output inductor (L). The compensation filter 160 can also adjust the AVP response by compensating for this lag. For example, parameter Kp_esr of the compensation filter 160 can be set to compensate for the ESR-induced lag. The dynamic voltage transition compensation circuit 112 can include an equivalent series resistance (ESR) gain component ($K_{vesr}$) to aid in compensating for the ESR-induced lag. One or both of the gain components $K_{cdv/dt}$ and $K_{vesr}$ can be adjusted based on the slew rate (SR), to further control the transition from one target voltage to a different target voltage e.g. to provide for a faster or slower transition than would otherwise be provided by just the main compensator 106. The slew rate can be fixed or maximized based on the system parameters as previously described herein.

Figure 8:
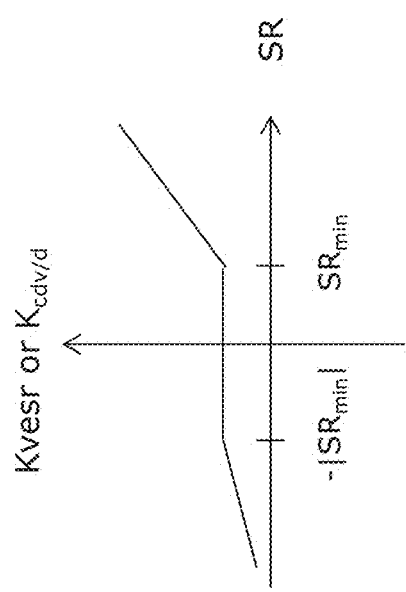
FIG. 8 illustrates embodiments of slew rate modifications made by a dynamic voltage transition compensation circuit.

FIG. 8 shows different cases of variable slew rate, where piecewise linear functions can be an option for adjusting the gain components $K_{cdv/dt}$ and/or $K_{vesr}$ based on slew rate modifications made by the dynamic voltage transition compensation circuit 112 to the voltage ramp (VID Ramp). For example, the dynamic voltage transition compensation circuit 112 can increase the ESR gain component $K_{vesr}$ and the capacitor current gain component $K_{cdv/dt}$ based on an increase to the slew rate made by the dynamic voltage transition compensation circuit 112.

The AVP block $H_{AVP}$ of the main compensator 106 can adjust the sensed output current Isen based on the droop resistance ($R_D$) of the load 102, and subtract the output capacitor current from the compensation filter 160 and the output of the post-ramp compensator 140 from the compensated output current. The resulting current value can pass through an AVP filter 162 which has a parameter KP_avp that can be set to achieve the desired AVP result. The output of the AVP filter 162 is subtracted from the voltage error Verr and from the output of the ESR gain component $K_{vesr}$, and the resulting signal is provided to the power stage 104 for controlling switching of the phase(s) 114.

FIGS. 9A and 9B illustrate ideal inductor current ($I_L$) and capacitor current ($I_{Cdv/dt}$) required for ramp-type dynamic voltage transition (FIG. 9A) and the net charge for completing a dynamic voltage transition (FIG. 9B). The extra current for charging the output capacitor (C) is referred to as $C_{dv/dt}$ current herein. The required net charge for the capacitor during a dynamic voltage transition is given by:

$$Q = I_{cdv/dt} * T_f = C\Delta V \quad (1)$$

where $T_f$ is the duration of the voltage transition from one level (V1) to a different level (V2). As shown in FIG. 9B, the net charge for completing any type of dynamic voltage transition $\Delta V$ is equal to Q. The bigger the $I_{cdv/dt}$ current, the shorter the transition time ($T_f$). The inductor saturation current ($I_{L,Max}$) limits the minimum transition time since $I_{cdv/dt}$ current is limited as given by:

$$I_{cdv/dt,Max} = I_{L,Max} - I_{L0} \quad (2)$$

where $I_{L0}$ is equal to load current and also equal to the averaged inductor current before the transition event.

The ramp slew rate optimizer 120 can be implemented so as to limit and reduce the slew rate value by an acceptable amount based on one or more system parameters. In one embodiment, the slew rate is initially set to a value by the voltage ramp generator 110. The ramp slew rate optimizer 120 can then limit the slew rate value (SR) as given by:

$$SR = \min\{SR\_set, \alpha(I_{L,max} = I_{L0})/C\} \quad (3)$$

where SR_set is the slew rate value set by the voltage ramp generator 110, $I_{L,Max}$ is the maximum rated current for the inductor which couples the power stage 104 to the load 102, and C is the capacitance of the capacitor coupled between the inductor and the load 102.

In one embodiment, the ramp slew rate optimizer 120 independently determines a slew rate based on the maximum rated current for the inductor ($I_{L,Max}$), the sensed output current (Isen), and the capacitance (C), and selects the minimum of the slew rate determined by the voltage ramp generator 110 and the slew rate determined by the ramp slew rate optimizer 120 as the slew rate for changing the voltage output by the power stage 104 to a new target voltage. A positive slew rate can be adaptively adjusted by $\alpha(I_{L,Max} - I_{L0})/C$, where a is a scaling factor. In one embodiment, α ranges between 0.5 and 1. A negative slew rate can be set to a fixed value or can be adjusted using a similar formula.

Figure 10:
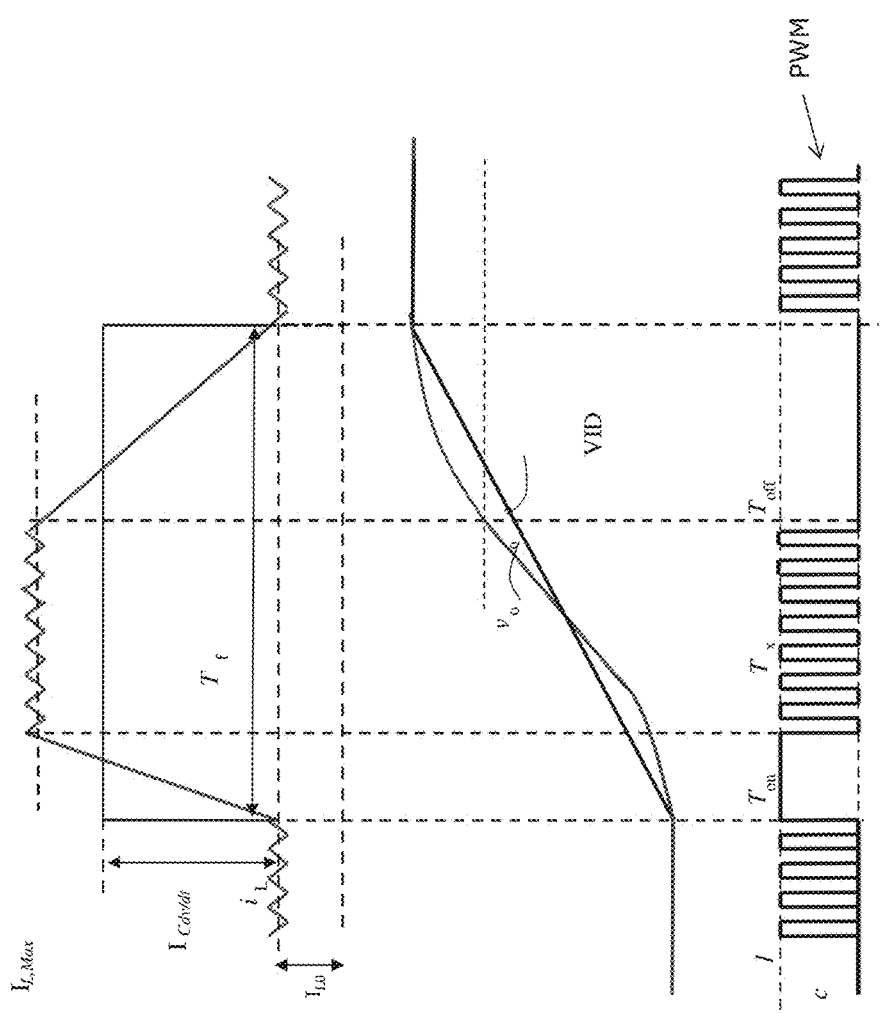
FIG. 10 illustrates a plot diagram of a dynamic voltage transition in the output voltage of a switched mode power converter that accounts for the inductor current limit.

FIG. 10 illustrates the fastest dynamic voltage transition in the output voltage (Vo) that accounts for the inductor current limit ($I_{L,Max}$). The dynamic voltage transition has three intervals: Ton; Tx; and Toff. Interval Ton represents the duration for the inductor current ($I_L$) to reach its maximum value ($I_{L,Max}$). Ideally the high-side switch (HS) of the power stage 104 can be on for the entire Ton period, but practically this may happen in several switching cycles with wide pulses due to the maximum PWM pulse width limit. Interval Tx represents the duration during which the inductor current is kept at its maximum level. Interval Toff represents the duration for the inductor current to return to the normal level. The low-side switch (LS) of the power stage 104 is turned on during interval Toff and the high-side switch is off. Any control with a similar response may result in a proximate time-optimal dynamic voltage transition response. There may be different objective functions for such a solution, such as minimized tracking error, etc. Also, bimodal control can be used that includes both the main compensator 106 and the auxiliary compensator 122, with the auxiliary compensator 122 being activated during dynamic voltage transition events. The auxiliary control mechanisms described herein address the fastest transition response or other optimized responses, as previously described herein.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of controlling a switched mode power converter that includes a power stage operable to output a voltage to a load, the method comprising:
   regulating the voltage output by the power stage to correspond to a target voltage indicated to the switched mode power converter;
   generating a voltage ramp that starts at a first voltage corresponding to the target voltage and ends at a second voltage corresponding to a new target voltage;
   responsive to the voltage ramp, modifying the output voltage response of the switched mode power converter based on one or more compensation parameters;
   determining a slew rate for a dynamic voltage transition in the voltage ramp; and
   modifying the slew rate based on the one or more compensation parameters.

2. The method of claim 1, wherein modifying the slew rate comprises modifying the slew rate based on a maximum rated current for an inductor which couples the power stage to the load, a sensed output current of the power stage and a capacitance of a capacitor coupled between the inductor and the load.

3. The method of claim 2, further comprising:
   independently determining another slew rate based on the maximum rated current for the inductor, the sensed output current, and the capacitance; and
   selecting the minimum of the slew rates as the slew rate for changing the voltage output by the power stage to the new target voltage.

4. The method of claim 3, wherein independently determining another slew rate based on the maximum rated current for the inductor, the sensed output current, and the capacitance comprises calculating the other slew rate as $\alpha(I_{L,max} - I_{L0})/C$), wherein $I_{L,max}$ is the maximum rated current for the inductor, $I_{L0}$ is equal to load current and equal to averaged inductor current before a dynamic transition event, C is the capacitance, and α is a scaling factor.

5. The method of claim 4, wherein a ranges between 0.5 and 1.

6. The method of claim 1, wherein the power stage is coupled to the load via an inductor, and wherein the method further comprises:

limiting the slew rate so that current in the inductor does not saturate during the dynamic voltage transition.

7. The method of claim 6, wherein limiting the slew rate comprises eliminating one or more PWM (pulse width modulation) pulses generated for controlling switching of the power stage.

8. The method of claim 1, further comprising:
responding to an error voltage that indicates the difference between the voltage ramp and a feedback voltage; and
modifying the error voltage so that the output voltage response of the switched mode power converter is modified in response.

9. The method of claim 8, wherein modifying the error voltage comprises scaling the one or more compensation parameters responsive to the voltage ramp.

10. The method of claim 9, wherein scaling the one or more compensation parameters responsive to the voltage ramp comprises scale the one or more compensation parameters to overcompensate or undercompensate the voltage ramp so that overshoot or undershoot in the voltage ramp is intentionally increased or decreased.

11. The method of claim 9, wherein scaling the one or more compensation parameters responsive to the voltage ramp comprises scaling the one or more compensation parameters differently for positive voltage ramps than for negative voltage ramps.

12. The method of claim 1, further comprising:
selecting an auxiliary compensator separate from a main compensator of the switched mode power converter, for controlling switching of the power stage during a dynamic voltage transition in the voltage ramp.

13. The method of claim 1, further comprising:
providing voltage compensation based on voltage feedback and current compensation based on current feedback, for controlling switching of the power stage; and
adjusting the voltage compensation and the current compensation.

14. The method of claim 1, further comprising:
scaling an equivalent series resistance gain component and a capacitor current gain component based on slew rate modifications made to the voltage ramp.

15. The method of claim 14, wherein scaling the equivalent series resistance gain component and the capacitor current gain component comprises increasing the equivalent series resistance gain component and the capacitor current gain component based on an increase to the slew rate.

16. The method of claim 1, further comprising:
changing or overriding at least one of an overcurrent protection limit and an overvoltage protection limit for the switched mode power converter during a dynamic voltage transition in the voltage ramp.

17. The method of claim 1, wherein the power stage comprises a plurality of phases at least one of which is switched by a PWM (pulse width modulation) signal during a dynamic voltage transition in the voltage ramp and one or more of which are initially deactivated prior to the dynamic voltage transition, the method further comprising:
re-activating one or more of the deactivated phases during the dynamic voltage transition.

18. The method of claim 1, further comprising:
modifying the output voltage response of the switched mode power converter by altering a dynamic voltage transition response of a main compensator that controls switching of the power stage.

19. A method of controlling a switched mode power converter that includes a power stage coupled to a load via an inductor and operable to output a voltage to the load, the method comprising:
regulating the voltage output by the power stage to correspond to a target voltage indicated to the switched mode power converter;
generating a voltage ramp that starts at a first voltage corresponding to the target voltage and ends at a second voltage corresponding to a new target voltage;
responsive to the voltage ramp, modifying the output voltage response of the switched mode power converter based on one or more compensation parameters; and
limiting a slew rate for a dynamic voltage transition in the voltage ramp so that current in the inductor does not saturate during the dynamic voltage transition.

20. The method of claim 19, wherein limiting the slew rate comprises eliminating one or more PWM (pulse width modulation) pulses generated for controlling switching of the power stage.

* * * * *